(12) United States Patent
Huang et al.

(10) Patent No.: US 9,694,569 B2
(45) Date of Patent: Jul. 4, 2017

(54) POLYIMIDE METAL LAMINATED PLATE AND METHOD OF MAKING THE SAME

(71) Applicant: TAIFLEX SCIENTIFIC CO., LTD., Kaohsiung (TW)

(72) Inventors: Ching-Hung Huang, Kaohsiung (TW); Kuang-Ting Hsueh, Kaohsiung (TW); Tzu-Ching Hung, Kaohsiung (TW); Hui-Chen Huang, Kaohsiung (TW)

(73) Assignee: Taiflex Scientific Co., Ltd., Kaohsiung (TW)

( * ) Notice: Subject to any disclaimer, the term of this patent is extended or adjusted under 35 U.S.C. 154(b) by 63 days.

(21) Appl. No.: 14/312,827

(22) Filed: Jun. 24, 2014

(65) Prior Publication Data

US 2015/0367606 A1    Dec. 24, 2015

(51) Int. Cl.
| | |
|---|---|
| *B32B 37/24* | (2006.01) |
| *B05D 7/16* | (2006.01) |
| *B05D 7/00* | (2006.01) |
| *B05D 3/02* | (2006.01) |
| *B32B 37/00* | (2006.01) |

(52) U.S. Cl.
CPC ............... *B32B 37/24* (2013.01); *B05D 7/16* (2013.01); *B05D 7/582* (2013.01); *B05D 3/0254* (2013.01);
(Continued)

(58) Field of Classification Search
CPC  B32B 7/02; B32B 27/08; B32B 27/34; B32B 27/24; B32B 15/088;
(Continued)

(56) References Cited

U.S. PATENT DOCUMENTS

| | | | | |
|---|---|---|---|---|
| 4,684,678 A | * | 8/1987 | Schultz | .............. C08G 59/5033 |
| | | | | 523/466 |
| 6,924,024 B2 | * | 8/2005 | Narui | ...................... B32B 15/08 |
| | | | | 156/308.2 |

(Continued)

FOREIGN PATENT DOCUMENTS

| | | |
|---|---|---|
| CN | 101353424 | 1/2009 |
| CN | 101448879 | 6/2009 |

(Continued)

*Primary Examiner* — Maria Veronica Ewald
*Assistant Examiner* — Ethan Weydemeyer
(74) *Attorney, Agent, or Firm* — Fishman & Associates, LLC.

(57) ABSTRACT

A polyimide metal laminated plate has a first metallic film, a first thermoplastic polyimide film laminated on a surface of the first metallic film, a first thermosetting polyimide film laminated on a surface of the first thermoplastic polyimide film distal from the first metallic film, and a second thermoplastic polyimide film laminated on a surface of the first thermosetting polyimide film distal from the first thermoplastic polyimide film. The polyimide metal laminated plate has no adhesive layer, so the polyimide metal laminated plate not only has good heat resistance, flame resistance, anti-chemical properties, and dimensional stability, but also meets the thinning tendency of FPCB. In addition, by the first thermosetting polyimide film and the second thermoplastic polyimide film having a water vapor transmission rate equal to or more than 170 g-$\mu$m/m$^2$-day, the delamination and whitening of the polyimide metal laminated plate is prevented.

14 Claims, 4 Drawing Sheets

(52) U.S. Cl.
CPC . *B32B 2037/0092* (2013.01); *B32B 2037/243* (2013.01); *B32B 2307/7246* (2013.01); *B32B 2311/12* (2013.01); *B32B 2379/08* (2013.01); *B32B 2457/08* (2013.01); *Y10T 156/10* (2015.01); *Y10T 428/24942* (2015.01); *Y10T 428/24975* (2015.01)

(58) Field of Classification Search
CPC ...... B32B 2037/243; B32B 2307/7246; B32B 2250/05; B32B 2250/40; B05D 1/36; B05D 3/0254; B05D 7/14; C08L 79/08; C08L 79/085; Y10T 428/24942; Y10T 428/24975; Y10T 156/10
USPC .............................. 428/212, 457–459, 473.5
See application file for complete search history.

(56) References Cited

U.S. PATENT DOCUMENTS 6,956,098 B2  10/2005  Summers et al.

| | | | |
|---|---|---|---|
| 2005/0100719 A1* | 5/2005 | Kanakarajan | B32B 15/08 428/209 |
| 2007/0044910 A1 | 3/2007 | Kuo et al. | |
| 2008/0070025 A1* | 3/2008 | Pavlin | A61L 9/012 428/304.4 |
| 2010/0291377 A1 | 11/2010 | Takabayashi et al. | |
| 2013/0011687 A1 | 1/2013 | Matsutani et al. | |
| 2013/0211040 A1* | 8/2013 | Nakao | C08G 73/1042 528/338 |
| 2013/0233381 A1* | 9/2013 | Win | C08G 73/1042 136/256 |

FOREIGN PATENT DOCUMENTS

| | | | |
|---|---|---|---|
| CN | 101998761 | 3/2011 | |
| CN | 1024085634 | 4/2012 | |
| CN | 102909934 | 2/2013 | |
| CN | 103660490 | 3/2014 | |
| JP | WO 2012039384 A1 * | 3/2012 | ......... C08G 73/1042 |
| TW | 200416242 | 9/2004 | |
| TW | 200821144 | 5/2008 | |
| TW | I310780 | 6/2009 | |
| TW | 201136765 | 11/2011 | |

\* cited by examiner

POLYIMIDE METAL LAMINATED PLATE AND METHOD OF MAKING THE SAME

BACKGROUND OF THE INVENTION

1. Field of the Invention

The present invention relates to a polyimide metal laminated plate and a method of making the same; particularly relates to a polyimide metal laminated plate without an adhesive layer and a method of making the same 2. Description of the Prior Art(s)

Polyimide of aromatic group has excellent heat-resistant, anti-chemical, mechanical, and electrical properties, such that polyimide is widely applied to flexible printed circuit boards (FPCB) for electronic appliances, for example, notebook computers, consumer electronics, and communications handheld electronic products.

Conventionally, to fabricate a FPCB, a polyimide film is taken as a substrate. Each of two opposite surfaces of the polyimide film is coated with epoxy resin or acrylate resin to form an adhesive layer. Each of two copper foils is laminated on one of the two opposite surfaces of the polyimide film by the corresponding adhesive layer and the FPCB is fabricated.

However, the adhesive layer made by epoxy resin or acrylate resin deteriorates the heat resistance, flame resistance, anti-chemical properties, and dimensional stability of the FPCB. In addition, the adhesive layer is thick and unable to meet the thinning tendency of FPCB.

To overcome the shortcomings, the present invention provides a polyimide metal laminated plate without an adhesive layer and a method of making the same to mitigate or obviate the aforementioned problems.

SUMMARY OF THE INVENTION

The main objective of the present invention is to provide a polyimide metal laminated plate without an adhesive layer and a method of making the same.

The polyimide metal laminated plate in accordance with the present invention has
- a first metallic film;
- a first thermoplastic polyimide film laminated on a surface of the first metallic film;
- a first thermosetting polyimide film laminated on a surface of the first thermoplastic polyimide distal from the first metallic film, wherein the first thermosetting polyimide film has a water vapor transmission rate equal to or more than 170 g-μm/m$^2$-day; and
- a second thermoplastic polyimide film laminated on a surface of the first thermosetting polyimide film distal from the first thermoplastic polyimide film, wherein the second thermoplastic polyimide film has a water vapor transmission rate equal to or more than the water vapor transmission rate of the first thermosetting polyimide film.

The polyimide metal laminated plate in accordance with the present invention has no adhesive layer, so the polyimide metal laminated plate not only has good heat resistance, flame resistance, anti-chemical properties, and dimensional stability, but also meets the thinning tendency of FPCB. In addition, by the first thermosetting polyimide film and the second thermoplastic polyimide film having a water vapor transmission rate equal to or more than 170 g-μm/m$^2$-day, the delamination and whitening of the polyimide metal laminated plate is prevented.

In an embodiment, the polyimide metal laminated plate has a second metallic film laminated on a surface of the second thermoplastic polyimide film distal from the first thermosetting polyimide film.

In an embodiment, the polyimide metal laminated plate has a third thermoplastic polyimide film laminated between the second metallic film and the second thermoplastic polyimide film.

In an embodiment, the polyimide metal laminated plate has a second thermosetting polyimide film laminated between the third thermoplastic polyimide film and the second thermoplastic polyimide film.

In an embodiment, the polyimide metal laminated plate has a fourth thermoplastic polyimide film laminated between the second thermosetting polyimide film and the second thermoplastic polyimide film.

Preferably, the second thermoplastic polyimide film has the water vapor transmission rate equal to or more than 200 g-μm/m$^2$-day.

Preferably, the first thermosetting polyimide film has the water vapor transmission rate equal to or more than 200 g-μm/m$^2$-day.

Preferably, a total thickness of the first thermoplastic polyimide film, the first thermosetting polyimide film, and the second thermoplastic polyimide film ranges from 9 μm to 25 μm.

Preferably, an overall water vapor transmission rate of the first thermoplastic polyimide film, the first thermosetting polyimide film, and the second thermoplastic polyimide film is equal to or more than 180 g-μm/m$^2$-day. The method of making the polyimide metal laminated plate in accordance with the present invention comprises the steps of:
- polymerizing a first diamine, a first reactive monomer and a first dianhydride in a first solvent to obtain a thermosetting polyimide precursor, wherein the first reactive monomer is selected from a group consisted of: 2,2'-bis(4-aminophenyl)propane, 1,3-bis(3-aminophenoxy)benzene, 4,4'-(1,3-phenylenediisopropylidene)bisaniline, 9,9'-bis(4-aminophenyl)fluorene, and polyoxypropylenediamine, and the first reactive monomer has a concentration ranging from 3.00 mol. % to 7.00 mol. % based on the total molar amount of the first diamine and the first reactive monomer;
- polymerizing a second diamine, a second reactive monomer and a second dianhydride in a second solvent to obtain a thermoplastic polyimide precursor, wherein the second reactive monomer is selected from a group consisted of: 2,2'-bis(4-aminophenyl)propane, 1,3-bis(3-aminophenoxy)benzene, 4,4'-(1,3-phenylenediisopropylidene)bisaniline, 9,9'-bis(4-aminophenyl)fluorene, and polyoxypropylenediamine, and the second reactive monomer has a concentration ranging from 35.00 mol. % to 65.00 mol. % based on the total molar amount of the second diamine and the second reactive monomer;
- coating the thermoplastic polyimide precursor on a surface of a first metallic film to form a first thermoplastic polyimide precursor layer;
- coating the thermosetting polyimide precursor on a surface of the first thermoplastic polyimide precursor layer distal from the first metallic film to form a first thermosetting polyimide precursor layer;
- coating the thermoplastic polyimide precursor on a surface of the first thermosetting polyimide precursor layer distal from the first thermoplastic polyimide precursor layer to form a second thermoplastic polyimide precursor layer; and imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film to obtain the polyimide metal laminated plate.

By the method in accordance with the present invention, a polyimide metal laminated plate having no adhesive layer is produced. Since the polyimide metal laminated plate has no adhesive layer, the polyimide metal laminated plate not only has good heat resistance, flame resistance, anti-chemical properties, and dimensional stability, but also meets the thinning tendency of FPCB. In addition, as the first thermosetting polyimide film and the second thermoplastic polyimide film of the polyimide metal laminated plate respectively have a water vapor transmission rate equal to or more than 170 g-μm/m$^2$-day, the delamination and whitening of the polyimide metal laminated plate is prevented.

Preferably, the step of imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film to obtain the polyimide metal laminated plate comprises the steps of:
  imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film; and
  laminating a second metallic film on a surface of the second thermoplastic polyimide film distal from the first thermosetting polyimide film to obtain the polyimide metal laminated plate.

Preferably, the step of imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film to obtain the polyimide metal laminated plate comprises the steps of:
  desolventizing the first thermoplastic polyimide precursor layer, the first thermosetting polyimide precursor layer, and the second thermoplastic polyimide precursor layer under a desolventizing temperature ranging from 80° C. to 150° C. to obtain a desolventized first thermoplastic polyimide precursor layer, a desolventized first thermosetting polyimide precursor layer, and a desolventized second thermoplastic polyimide precursor layer; and
  heating the desolventized first thermoplastic polyimide precursor layer, the desolventized first thermosetting polyimide precursor layer, and the desolventized second thermoplastic polyimide precursor layer simultaneously to a imidization temperature of 160° C. to 190° C., a imidization temperature of 190° C. to 300° C., and a imidization temperature of 300° C. to 350° C. in sequence to obtain the first thermoplastic polyimide film, the first thermosetting polyimide film, and the second thermoplastic polyimide film.

Preferably, the first diamine and the second diamine are selected from a group consisted of 3,4'-diaminodiphenyl ether, 4,4'-diaminodiphenyl ether, p-phenylenediamine, m-phenylenediamine, 3,5-diaminobenzoic acid, 2,2'-bis(4-aminophenyl)propane, 4,4'-diaminodiphenyl methane, 4,4'-diaminodiphenyl sulfone, 3,4'-diaminodiphenyl sulfone, 4,4'-diaminodiphenyl sulfide, 1,3-bis(4-aminophenoxy)benzene), 1,3-bis(3-aminophenoxy)benzene, 1,4-bis(4-aminophenoxy)benzene, 4,4-bis(3-aminophenoxy)biphenyl, 2,2'-bis[4-(4-aminophenoxy)phenyl]propane, 2,2'-bis[4-(3-aminophenoxy)pheny]propane, 2,2'-dimethyl-4,4'-diaminobiphenyl, 3,3'-dimethyl-4,4'-diaminobiphenyl, 3,3'-dihydroxybiphenyl-4,4'-diamino, 9,9'-bis(4-aminophenyl)fluorene), 2,2'-bis(4-(3-aminophenoxyl)phenyl)sulfon, 2,6-diaminopyridine, polyoxypropylenediamine, 4,4'-(1,3-phenylenediisopropylidene)bisaniline, 4,4'-(1,4-phenylenediisopropylidene)bisaniline, norbornane dimethylamine and a combination thereof.

More preferably, polyoxypropylenediamine is selected form a group consisted of Jeffamine® D230, Jeffamine® D400 and Jeffamin® D2000.

Preferably, the first dianhydride and the second dianhydride are selected from a group consisted of pyromellitic dianhydride, 3,3',4,4'-biphenyl tetracarboxylic dianhydride, 3,3',4,4'-benzophenone tetracarboxylic dianhydride, 4,4'-oxydiphthalic dianhydride, 3,3',4,4'-diphenylsulfone tetracarboxylic dianhydride, 2,2'-bis(4-carboxyphenyl)hexafluoropropane, ethylene glycol-bis-trimellitate anhydride, 1,3-dihydro-1,3-dioxo-5-isobenzofurancarboxylic acid phenylene ester, 1,2,3,4-butanetetracarboxylic dianhydride, 1,2,3,4-cyclopentanetetracarboxylic dianhydride, and a combination thereof.

Preferably, the first solvent and the second solvent are selected from a group consisted of tetrahydrofuran, N,N-dimethylformide, N,N-dimethylacetamide, N-methyl-2-pyrrolidone, γ-butyrolactone and a combination thereof.

Preferably, the concentration of the first reactive monomer ranges from 3.00 molar percent (mol. %) to 7.00 molar percent (mol. %) based on the total amount of the first diamine and the first reactive monomer.

Preferably, the concentration of the second reactive monomer ranges from 35.00 mol. % to 65.00 mol. % based on the total amount of the second diamine and the second reactive monomer.

Other objectives, advantages and novel features of the invention will become more apparent from the following detailed description when taken in conjunction with the accompanying drawings.

DETAILED DESCRIPTION OF THE PREFERRED EMBODIMENTS

Preparation 1 Fabrication of a Thermosetting Polyimide Precursor

In a 1 liter four-neck reaction flask, 19.877 grams of p-phenylenediamine and 1.940 grams of 4,4'-diaminodiphenyl ether were dissolved in 425 grams of N-methyl-2-pyrrolidone under a temperature of 25±5° C. and a nitrogen atmosphere to obtain a diamine solution. 8.029 grams of pyromellitic dianhydride was added into the diamine solution to process a first polymerization and a first polymerized solution was obtained. 45.60 grams of 3,3',4,4'-biphenyl tetracarboxylic dianhydride was divided into three batches. The three batches of 3,3',4,4'-biphenyl tetracarboxylic dianhydride were added into the first polymerized solution in sequence and stirred for 4 hours to process a secondary polymerization. The thermosetting polyimide precursor was obtained after the secondary polymerization. In the present preparation, the thermosetting polyimide precursor was marked as PI-1.

Preparation 2 Fabrication of a Thermosetting Polyimide Precursor

The present preparation was similar to Preparation 1. The differences between the present preparation and Preparation 1 were as follows.

19.159 grams of p-phenylenediamine, 1.870 grams of 4,4'-diaminodiphenyl ether, and a first reactive monomer were dissolved in 425 grams of N-methyl-2-pyrrolidone to obtain the diamine solution. 7.739 grams of pyromellitic dianhydride was added into the diamine solution to process the first polymerization and obtain the first polymerized solution.

The first reactive monomer was polyoxypropylenediamine (Jeffamine® D400). The usage amount of the first reactive monomer was 2.260 grams. The concentration of the first reactive monomer was 2.74 mol. % based on the total amount of p-phenylenediamine, 4,4'-diaminodiphenyl ether, and the first reactive monomer.

In the present preparation, the thermosetting polyimide precursor was marked as PI-2.

Preparation 3 Fabrication of a Thermosetting Polyimide Precursor

The present preparation was similar to Preparation 1. The differences between the present preparation and Preparation 1 were as follows.

18.708 grams of p-phenylenediamine, 1.826 grams of 4,4'-diaminodiphenyl ether, and a first reactive monomer were dissolved in 425 grams of N-methyl-2-pyrrolidone to obtain the diamine solution. 7.557 grams of pyromellitic dianhydride was added into the diamine solution to process the first polymerization and obtain the first polymerized solution.

The first reactive monomer was polyoxypropylenediamine (Jeffamine® D400). The usage amount of the first reactive monomer was 3.772 grams. The concentration of the first reactive monomer was 4.59 mol. % based on the total amount of p-phenylenediamine, 4,4'-diaminodiphenyl ether, and the first reactive monomer.

In the present preparation, the thermosetting polyimide precursor was marked as PI-3.

Preparation 4 Fabrication of a Thermosetting Polyimide Precursor

The present preparation was similar to Preparation 1. The differences between the present preparation and Preparation 1 were as follows.

19.044 grams of p-phenylenediamine, 1.858 grams of 4,4'-diaminodiphenyl ether, and a first reactive monomer were dissolved in 425 grams of N-methyl-2-pyrrolidone to obtain the diamine solution. 7.692 grams of pyromellitic dianhydride was added into the diamine solution to process the first polymerization and obtain the first polymerized solution.

The first reactive monomer was 9,9'-bis(4-aminophenyl)fluorene. The usage amount of the first reactive monomer was 2.263 grams. The concentration of the first reactive monomer was 3.39 mol. % based on the total amount of p-phenylenediamine, 4,4'-diaminodiphenyl ether, and the first reactive monomer.

In the present preparation, the thermosetting polyimide precursor was marked as PI-4.

Preparation 5 Fabrication of a Thermosetting Polyimide Precursor

The present preparation was similar to Preparation 1. The differences between the present preparation and Preparation 1 were as follows. 18.490 grams of p-phenylenediamine, 1.804 grams of 4,4'-diaminodiphenyl ether, and a first reactive monomer were dissolved in 425 grams of N-methyl-2-pyrrolidone to obtain the diamine solution. 7.469 grams of pyromellitic dianhydride was added into the diamine solution to process the first polymerization and obtain the first polymerized solution.

The first reactive monomer was 9,9'-bis(4-aminophenyl)fluorene. The usage amount of the first reactive monomer was 3.772 grams. The concentration of the first reactive monomer was 5.67 mol. % based on the total amount of p-phenylenediamine, 4,4'-diaminodiphenyl ether, and the first reactive monomer.

In the present preparation, the thermosetting polyimide precursor was marked as PI-5.

Preparation 6 Fabrication of a Thermosetting Polyimide Precursor

The present preparation was similar to Preparation 1. The differences between the present preparation and Preparation 1 were as follows.

19.332 grams of p-phenylenediamine and a first reactive monomer were dissolved in 425 grams of N-methyl-2-pyrrolidone to obtain the diamine solution. 7.512 grams of pyromellitic dianhydride was added into the diamine solution to process the first polymerization and obtain the first polymerized solution.

The first reactive monomer comprised polyoxypropylenediamine (Jeffamine® D400) and 9,9'-bis(4-aminophenyl)fluorene. The usage amount of polyoxypropylenediamine was 2.057 grams. The usage amount of 9,9'-bis(4-aminophenyl)fluorene was 2.667 grams. The concentration of the first reactive monomer was 6.50 mol. % based on the total amount of p-phenylenediamine and the first reactive monomer.

In the present preparation, the thermosetting polyimide precursor was marked as PI-6.

Preparation 7 Fabrication of a Thermoplastic Polyimide Precursor

In a 1 liter four-neck reaction flask, 5.515 grams of p-phenylenediamine and a second reactive monomer were dissolved in 425 grams of N-methyl-2-pyrrolidone under a temperature of 25±5° C. and a nitrogen atmosphere to obtain a diamine solution. 45.60 grams of 3,3',4,4'-biphenyl tetracarboxylic dianhydride was divided into three batches. The three batches of 3,3',4,4'-biphenyl tetracarboxylic dianhydride were added into the diamine solution in sequence and stirred for 4 hours to process a polymerization. The thermoplastic polyimide precursor was obtained after the polymerization. In the present preparation, the thermoplastic polyimide precursor was marked as TPI-1.

Preparation 8 Fabrication of a Thermoplastic Polyimide Precursor

The present preparation was similar to Preparation 7. The differences between the present preparation and Preparation 7 were as follows.

5.516 grams of p-phenylenediamine and the second reactive monomer were dissolved in 425 grams of N-methyl-2-pyrrolidone to obtain the diamine solution.

The second reactive monomer comprised 4,4'-(1,3-phenylenediisopropylidene) bisaniline and 2,2'-bis(4-aminophenyl)propane. The usage amount of 4,4'-(1,3-phenylenediisopropylidene)bisaniline was 23.435 grams. The usage amount of 2,2'-bis(4-aminophenyl)propane was 5.990 grams. The concentration of the second reactive monomer was 61.80 mol. % based on the total amount of p-phenylenediamine and the second reactive monomer.

In the present preparation, the thermoplastic polyimide precursor was marked as TPI-2.

Preparation 9 Fabrication of a Thermoplastic Polyimide Precursor

The present preparation was similar to Preparation 7. The differences between the present preparation and Preparation 7 were as follows.

23.821 grams of 1,3-bis(4-aminophenoxy)benzene and the second reactive monomer were dissolved in 425 grams of N-methyl-2-pyrrolidone to obtain the diamine solution. 14.383 grams of pyromellitic dianhydride was added into the diamine solution to process a first polymerization and a first polymerized solution was obtained. 20.00 grams of 3,3',4,4'-biphenyl tetracarboxylic dianhydride was divided into two batches. The two batches of 3,3',4,4'-biphenyl tetracarboxylic dianhydride were added into the first polymerized solution in sequence and stirred for 4 hours to process a secondary polymerization. The thermoplastic polyimide precursor was obtained after the secondary polymerization The second reactive monomer was 4,4'-(1,3-phenylenediisopropylidene) bisaniline. The usage amount of 4,4'-(1, 3-phenylenediisopropylidene)bisaniline was 18.735 grams. The concentration of the second reactive monomer was 35.87 mol. % based on the total amount of 1,3-bis(4-aminophenoxy)benzene and the second reactive monomer.

In the present preparation, the thermoplastic polyimide precursor was marked as TPI-3.

Preparation 10 Fabrication of a Thermoplastic Polyimide Precursor

The present preparation was similar to Preparation 7. The differences between the present preparation and Preparation 7 were as follows.

18.196 grams of 1,3-bis(4-aminophenoxy)benzene and the second reactive monomer were dissolved in 425 grams of N-methyl-2-pyrrolidone to obtain the diamine solution. 10.466 grams of pyromellitic dianhydride was added into the diamine solution to process a first polymerization and a first polymerized solution was obtained. 22.00 grams of 3,3',4,4'-biphenyl tetracarboxylic dianhydride was divided into two batches. The two batches of 3,3',4,4'-biphenyl tetracarboxylic dianhydride were added into the first polymerized solution in sequence and stirred for 4 hours to process a secondary polymerization. The thermoplastic polyimide precursor was obtained after the secondary polymerization.

The second reactive monomer was 2,2'-bis(4-aminophenyl)propane. The usage amount of 2,2'-bis(4-aminophenyl)propane was 25.581 grams. The concentration of the second reactive monomer was 50.00 mol. % based on the total amount of 1,3-bis(4-aminophenoxy)benzene and the second reactive monomer.

In the present preparation, the thermoplastic polyimide precursor was marked as TPI-4.

Experiment 1 Polyimide Metal Laminated Plate and Method of Making the Same

Figure 1:
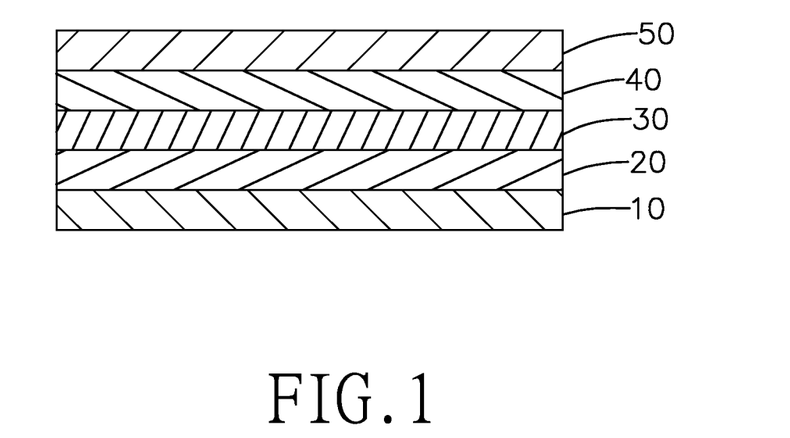
FIG. 1 is an enlarged side view in cross section of each polyimide metal laminated plate of Experiments 1 to 9 and Comparison 1 in accordance with the present invention.

With reference to FIG. 1, a polyimide metal laminated plate comprised a first copper film 10, a first thermoplastic polyimide film 20, a first thermosetting polyimide film 30, a second thermoplastic polyimide film 40, and a second copper film 50. The first thermoplastic polyimide film 20 was laminated on a surface of the first copper film 10. The first thermosetting polyimide film 30 was laminated on a surface of the first thermoplastic polyimide film 20 distal from the first copper film 10. The second thermoplastic polyimide film 40 was laminated on a surface of the first thermosetting polyimide film 30 distal from the first thermoplastic polyimide film 20. The second copper film 50 was laminated on a surface of the second thermoplastic polyimide film 40 distal from the first thermosetting polyimide film 30. Each of the first thermoplastic polyimide film 20 and the second thermoplastic polyimide film 40 had a thickness of 2 μm. The first thermosetting polyimide film 30 had a thickness of 15 μm.

The method of making the polyimide metal laminated plate was described in detail as follows.

TPI-1 was coated on a surface of the first copper film 10 to form a first thermoplastic polyimide precursor layer. And then, PI-5 was coated on a surface of the first thermoplastic polyimide precursor layer distal from the first copper film 10 to form a first thermosetting polyimide precursor layer. Then, TPI-1 was coated on a surface of the first thermosetting polyimide precursor layer distal from the first thermoplastic polyimide precursor layer to form a second thermoplastic polyimide precursor layer.

Afterwards, the solvent, which was N-methyl-2-pyrrolidone, was removed from the first thermoplastic polyimide precursor layer, the first thermosetting polyimide precursor layer, and the second thermoplastic polyimide precursor layer under a desolventizing temperature ranging from 80° C. to 150° C., and a desolventized first thermoplastic polyimide precursor layer, a desolventized first thermosetting polyimide precursor layer, and a desolventized second thermoplastic polyimide precursor layer were obtained.

Next, the desolventized first thermoplastic polyimide precursor layer, the desolventized first thermosetting polyimide precursor layer, and the desolventized second thermoplastic polyimide precursor layer were heated simultaneously to a imidization temperature of 160° C. to 190° C., a imidization temperature of 190° C. to 300, and a imidization temperature of 300° C. to 350° C. in sequence under a nitrogen atmosphere. After heating, the desolventized first thermoplastic polyimide precursor layer, the desolventized first thermosetting polyimide precursor layer, and the desolventized second thermoplastic polyimide precursor layer were respectively imidized to the first thermoplastic polyimide film 20, the first thermosetting polyimide film 30, and the second thermoplastic polyimide film 40.

After the copper film 50 was laminated on a surface of the second thermoplastic polyimide film 40 distal from the first thermosetting polyimide film 30 under a lamination temperature ranging from 320° C. to 380° C. and a lamination pressure ranging from 50 KgF/cm² to 100 KgF/cm², the polyimide metal laminated plate was obtained.

Experiment 2 Polyimide Metal Laminated Plate and Method of Making the Same

The present experiment was similar to Experiment 1. The difference between the present experiment and Experiment 1 was that the first thermosetting polyimide film had a thickness of 8 μm.

Experiment 3 Polyimide Metal Laminated Plate and Method of Making the Same

The present experiment was similar to Experiment 1. The difference between the present experiment and Experiment 1 was that the first thermosetting polyimide film was made from PI-6.

Experiment 4 Polyimide Metal Laminated Plate and Method of Making the Same

The present experiment was similar to Experiment 1. The differences between the present experiment and Experiment 1 were that the first thermosetting polyimide film was made from PI-6 and the first thermosetting polyimide had a thickness of 5 μm.

Experiment 5 Polyimide Metal Laminated Plate and Method of Making the Same

The present experiment was similar to Experiment 1. The differences between the present experiment and Experiment 1 were as follows.

The first and the second thermoplastic polyimide films were made from TPI-2. The first thermosetting polyimide film was made from PI-6 and the first thermosetting polyimide film had a thickness of 20 μm.

Experiment 6 Polyimide Metal Laminated Plate and Method of Making the Same

The present experiment was similar to Experiment 1. The differences between the present experiment and Experiment 1 were as follows.

The first and the second thermoplastic polyimide films were made from TPI-2. The first thermosetting polyimide film was made from PI-6 and the first thermosetting polyimide had a thickness of 8 μm.

Experiment 7 Polyimide Metal Laminated Plate and Method of Making the Same

The present experiment was similar to Experiment 1. The differences between the present experiment and Experiment 1 were as follows.

The first and the second thermoplastic polyimide films were made from TPI-3. The first thermosetting polyimide film was made from PI-6 and had a thickness of 8 μm.

Experiment 8 Polyimide Metal Laminated Plate and Method of Making the Same

The present experiment was similar to Experiment 1. The differences between the present experiment and Experiment 1 were as follows.

The first and the second thermoplastic polyimide films were made from TPI-4. The first thermosetting polyimide film was made from PI-6 and had a thickness of 8 μm.

Experiment 9 Polyimide Metal Laminated Plate and Method of Making the Same

The present experiment was similar to Experiment 1. The difference between the present experiment and Experiment 1 was that the first thermosetting polyimide film was made from PI-4.

Experiment 10 Polyimide Metal Laminated Plate

Figure 2:
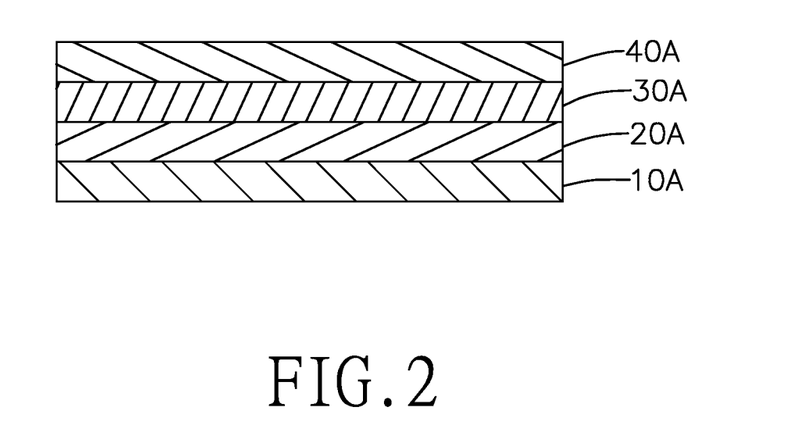
FIG. 2 is an enlarged side view in cross section of a polyimide metal laminated plate of Experiment 10 in accordance with the present invention.

With reference to FIG. 2, a polyimide metal laminated plate comprised a copper film 10A, a first thermoplastic polyimide film 20A, a first thermosetting polyimide film 30A, and a second thermoplastic polyimide film 40A. The first thermoplastic polyimide film 20A was laminated on a surface of the copper film 10A. The first thermosetting polyimide film 30A was laminated on a surface of the first thermoplastic polyimide film 20A distal from the copper film 10A. The second thermoplastic polyimide film 40A was laminated on a surface of the first thermosetting polyimide film 30A distal from the first thermoplastic polyimide film 20A.

With reference to FIGS. 1 and 2, the copper film 10A, the first thermoplastic polyimide film 20A, the first thermosetting polyimide film 30A, and the second thermoplastic polyimide film 40A of the present experiment were respectively equivalent to the first copper film 10, the first thermoplastic polyimide film 20, the first thermosetting polyimide film 30, and the second thermoplastic polyimide film 40 of Experiment 1.

Experiment 11 Polyimide Metal Laminated Plate

Figure 3:
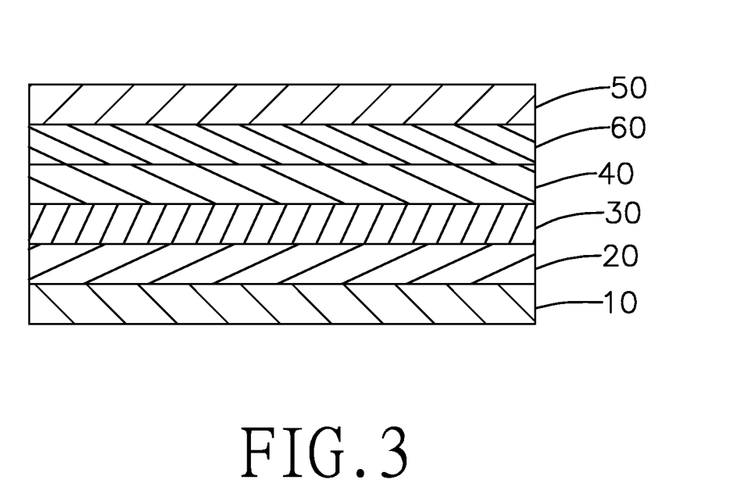
FIG. 3 is an enlarged side view in cross section of a polyimide metal laminated plate of Experiment 11 in accordance with the present invention.

With reference to FIGS. 1 and 3, the present experiment was similar to Experiment 1. The difference between the present experiment and Experiment 1 was that the polyimide metal laminated plate had a third thermoplastic polyimide film 60 laminated between the second copper film 50 and the second thermoplastic polyimide film 40.

Experiment 12 Polyimide Metal Laminated Plate

Figure 4:
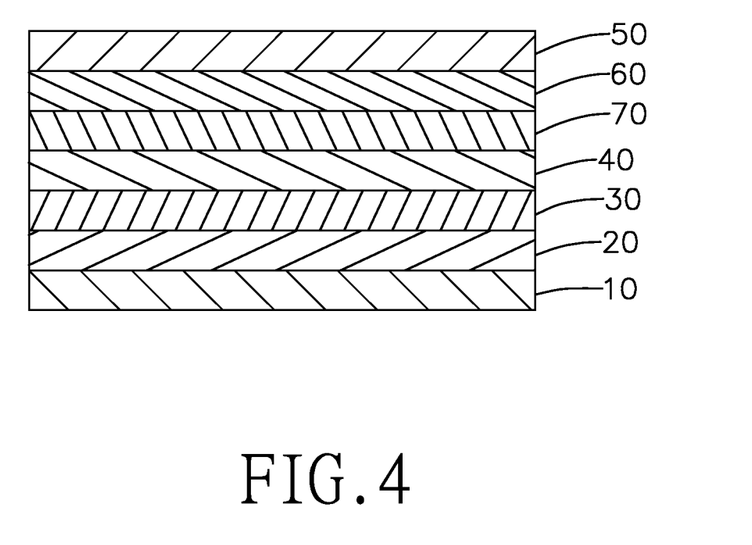
FIG. 4 is an enlarged side view in cross section of a polyimide metal laminated plate of Experiment 12 in accordance with the present invention.

With reference to FIGS. 3 and 4, the present experiment was similar to Experiment 11. The difference between the present experiment and Experiment 11 was that the polyimide metal laminated plate had a second thermosetting polyimide film 70 laminated between the third thermoplastic polyimide film 60 and the second thermoplastic polyimide film 40.

Experiment 13 Polyimide Metal Laminated Plate

Figure 5:
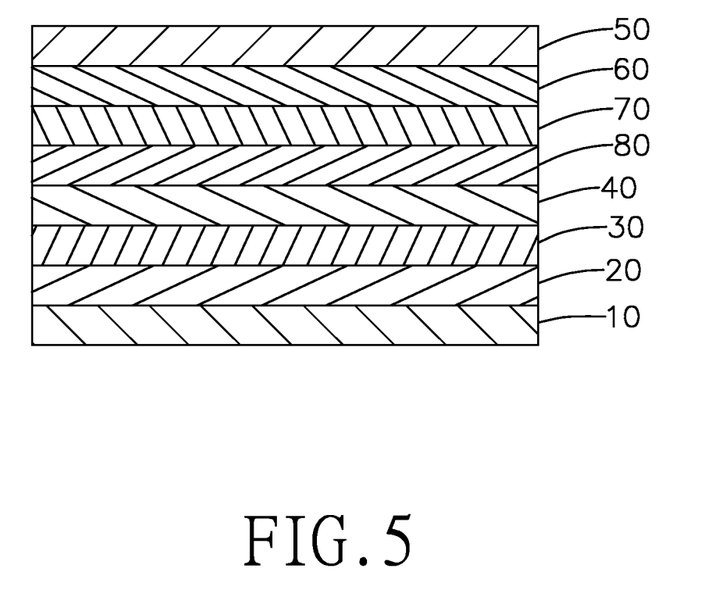
FIG. 5 is an enlarged side view in cross section of a polyimide metal laminated plate of Experiment 13 in accordance with the present invention.

With reference to FIGS. 4 and 5, the present experiment was similar to Experiment 12. The difference between the present experiment and Experiment 12 was that the polyimide metal laminated plate had a fourth thermoplastic polyimide film 80 laminated between the second thermosetting polyimide film 70 and the second thermoplastic polyimide film 40.

Comparison 1 Polyimide Metal Laminated Plate and Method of Making the Same

The present comparison was similar to Experiment 1. The differences between the present comparison and Experiment 1 were as follows.

The first thermosetting polyimide film was made from PI-3 and had a thickness of 8 μm.

Comparison 2 Polyimide Metal Laminated Plate and Method of Making the Same

Figure 6:
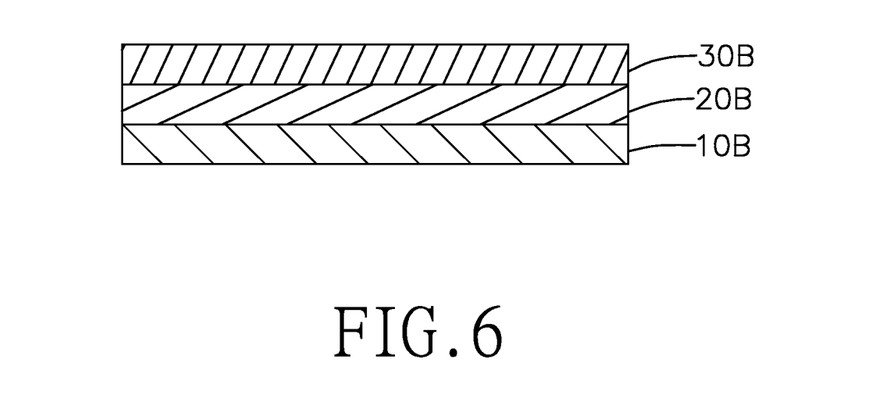
FIG. 6 is an enlarged side view in cross section of each polyimide metal laminated plate of Comparisons 2 to 7 in accordance with the present invention.

With reference to FIG. 6, a polyimide metal laminated plate comprised a copper film 10B, a thermoplastic polyimide film 20B and a thermosetting polyimide film 30B. The thermoplastic polyimide film 20B was laminated on a surface of the copper film 10B. The thermosetting polyimide film 30B was laminated on a surface of the thermoplastic polyimide film 20B distal from the copper film 10B. The thermoplastic polyimide film 20B had a thickness ranging from 2 μm to 3 μm. The thermosetting polyimide film 30B had a thickness ranging from 17 μm to 18 μm.

With reference to FIGS. 1 and 6, the copper film 10B, the thermoplastic polyimide film 20B, and the thermosetting polyimide film 30B of the present comparison were respectively equivalent to the first copper film 10, the first thermoplastic polyimide film 20, and the first thermosetting polyimide film 30 of Experiment 1.

The method of making the polyimide metal laminated plate of the present comparison was described in detail as follows.

TPI-1 was coated on a surface of the copper film 10B to form a thermoplastic polyimide precursor layer. Then, PI-1 was coated on a surface of the thermoplastic polyimide precursor layer distal from the copper film 10B to form a thermosetting polyimide precursor layer.

Afterwards, the solvent, which was N-methyl-2-pyrrolidone, was removed from the thermoplastic polyimide precursor layer and the thermosetting polyimide precursor layer under a desolventizing temperature ranging from 80° C. to 150° C., and a desolventized thermoplastic polyimide precursor layer and a desolventized thermosetting polyimide precursor layer were obtained.

Next, the desolventized thermoplastic polyimide precursor layer and the desolventized thermosetting polyimide precursor layer were heated simultaneously to a imidization temperature of 160° C. to 190° C., a imidization temperature of 190° C. to 300° C., and a imidization temperature of 300° C. to 350° C. in sequence under a nitrogen atmosphere. After heating, the desolventized thermoplastic polyimide precursor layer and the desolventized thermosetting polyimide precursor layer were respectively imidized to the thermoplastic polyimide film 20B and the thermosetting polyimide film 30B; the polyimide metal laminated plate was obtained.

Comparison 3 Polyimide Metal Laminated Plate and Method of Making the Same

The present comparison was similar to Comparison 2. The difference between the present comparison and Comparison 2 was that the thermosetting polyimide film was made from PI-2.

Comparison 4 Polyimide Metal Laminated Plate and Method of Making the Same

The present comparison was similar to Comparison 2. The difference between the present comparison and Comparison 2 was that the thermosetting polyimide film was made from PI-3.

Comparison 5 Polyimide Metal Laminated Plate and Method of Making the Same

The present comparison was similar to Comparison 2. The difference between the present comparison and Comparison 2 was that the thermosetting polyimide film was made from PI-4.

Comparison 6 Polyimide Metal Laminated Plate and Method of Making the Same

The present comparison was similar to Comparison 2. The difference between the present comparison and Comparison 2 was that the thermosetting polyimide film was made from PI-5.

Comparison 7 Polyimide Metal Laminated Plate and Method of Making the Same

The present comparison was similar to Comparison 2. The difference between the present comparison and Comparison 2 was that the thermosetting polyimide film was made from PI-6.

Comparison 8 Polyimide Metal Laminated Plate and Method of Making the Same

Figure 7:
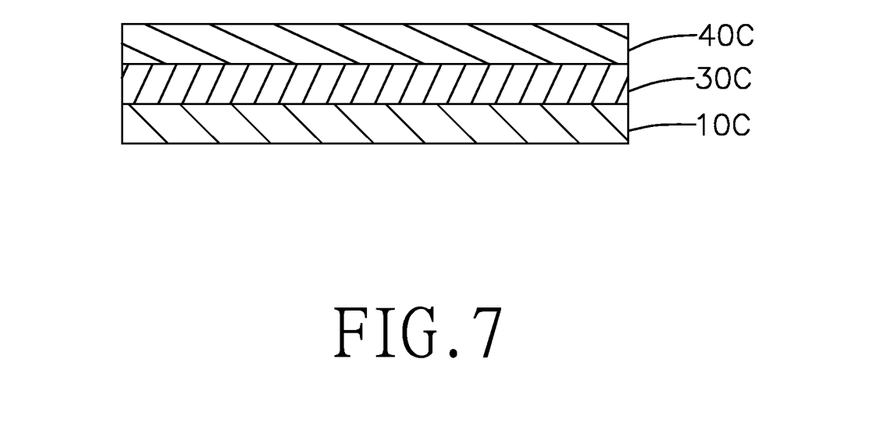
FIG. 7 is an enlarged side view in cross section of each polyimide metal laminated plate of Comparisons 8 to 13 in accordance with the present invention.

With reference to FIG. 7, a polyimide metal laminated plate comprised a copper film 10C, a thermosetting polyimide film 30C and a thermoplastic polyimide film 40C. The thermosetting polyimide film 30C was laminated on a surface of the copper film 10C. The thermoplastic polyimide film 40C was laminated on a surface of the thermosetting polyimide film 30C distal from the copper film 10C. The thermosetting polyimide film 30C had a thickness ranging from 17 μm to 18 μm. The thermoplastic polyimide film 40C had a thickness ranging from 2 μm to 3 μm.

With reference to FIGS. 1 and 7, the copper film 10C, the thermosetting polyimide film 30C, and the thermoplastic polyimide film 40C of the present comparison were respectively equivalent to the first copper film 10, the first thermosetting polyimide film 30, and the second thermoplastic polyimide film 40 of Experiment 1.

The method of making the polyimide metal laminated plate of the present comparison was described in detail as follows.

PI-3 was coated on a surface of the copper film 10C to form a thermosetting plastic polyimide precursor layer. Then, TPI-1 was coated on a surface of the thermosetting polyimide precursor layer distal from the copper film 10C to form a thermoplastic polyimide precursor layer.

Afterwards, the solvent, which was N-methyl-2-pyrrolidone, was removed from the thermosetting polyimide precursor layer and the thermoplastic polyimide precursor layer under a desolventizing temperature ranging from 80° C. to 150° C., and a desolventized thermosetting polyimide precursor layer and a desolventized thermoplastic polyimide precursor layer were obtained.

Next, the desolventized thermosetting polyimide precursor layer and the desolventized thermoplastic polyimide precursor layer were heated simultaneously to a imidization temperature of 160° C. to 190° C., a imidization temperature of 190° C. to 300° C., and a imidization temperature of 300° C. to 350° C. in sequence under a nitrogen atmosphere. After heating, the desolventized thermosetting polyimide precursor layer and the desolventized thermoplastic polyimide precursor layer were respectively imidized to the thermosetting polyimide film 30C and the thermoplastic polyimide film 40C; the polyimide metal laminated plate was obtained.

Comparison 9 Polyimide Metal Laminated Plate and Method of Making the Same

The present comparison was similar to Comparison 8. The difference between the present comparison and Comparison 8 was that the thermosetting polyimide film was made from PI-4.

Comparison 10 Polyimide Metal Laminated Plate and Method of Making the Same

The present comparison was similar to Comparison 8. The difference between the present comparison and Comparison 8 was that the thermosetting polyimide film was made from PI-5.

Comparison 11 Polyimide Metal Laminated Plate and Method of Making the Same

The present comparison was similar to Comparison 8. The differences between the present comparison and Comparison 8 were that the thermosetting polyimide film and the thermoplastic polyimide film were respectively made from PI-5 and TPI-2.

Comparison 12 Polyimide Metal Laminated Plate and Method of Making the Same

The present comparison was similar to Comparison 8. The differences between the present comparison and Comparison son 8 were that the thermosetting polyimide film and the thermoplastic polyimide film were respectively made from PI-6 and TPI-3.

Comparison 13 Polyimide Metal Laminated Plate and Method of Making the Same

The present comparison was similar to Comparison 8. The differences between the present comparison and Comparison 8 were that the thermosetting polyimide film and the thermoplastic polyimide film were respectively made from PI-6 and TPI-4.

Results and Discussion

The results and discussion were related to the properties of glass transition temperature ($T_g$), coefficient of thermal expansion (C.T.E.), water vapor transmission rate (W.V.T.R.), peeling strength, dimensional stability and solder resistance.

$T_g$ was measured by the Pyris Diamond dynamics mechanical analyzer of PerkinElmer Co. under a temperature gradient of 10° C./min.

C.T.E. was measured by the Pyris Diamond thermal mechanical analyzer of PerkinElmer Co. under a temperature gradient of 10° C./min.

W.V.T.R. was measured by PERMATRAN-W Model 3/61 water vapor transmission rate analyzer of Mocon Inc. under 40° C. and 90% RH.

According to IPC-TM-650 2.4.9, peeling strength was measured.

According to the method B and method C of IPC-TM-650 2.2.4, dimensional stability was measured.

According to IPC-TM-650 2.4.13, a solder resistance test was measured under a condition of 300° C./30 sec to evaluate the solder resistance.

In addition, the results and discussion were related to the delamination and whitening caused by a cyclization reaction.

TABLE 1

Properties of each polyimide metal laminated plate of Experiments 1 to 4 and Comparison 1, and thickness and raw material of the films of the same.

| | | Comparison 1 | Experiment 1 | Experiment 2 | Experiment 3 | Experiment 4 |
|---|---|---|---|---|---|---|
| Second thermoplastic polyimide film | Raw material | TPI-1 | TPI-1 | TPI-1 | TPI-1 | TPI-1 |
| | Thickness (unit: μm) | 2 | 2 | 2 | 2 | 2 |
| First thermosetting polyimide film | Raw material | PI-3 | PI-5 | PI-5 | PI-6 | PI-6 |
| | Thickness (unit: μm) | 8 | 15 | 8 | 15 | 5 |
| First thermoplastic polyimide film | Raw material | TPI-1 | TPI-1 | TPI-1 | TPI-1 | TPI-1 |
| | Thickness (unit: μm) | 2 | 2 | 2 | 2 | 2 |
| Peeling strength (unit: kgf/cm) | | n/a | 1.28 | 1.03 | 1.66 | 1.08 |
| Dimensional Stability (method B) | M.D. | n/a | 0.021% | −0.025% | 0.040% | 0.026% |
| | T.D. | n/a | −0.028% | −0.062% | −0.013% | −0.023% |
| Dimensional Stability (method C) | M.D. | n/a | 0.016% | −0.029% | 0.028% | 0.005% |
| | T.D. | n/a | −0.039% | −0.073% | −0.019% | −0.046% |
| Solder resistance test | | n/a | Passed | Passed | Passed | Passed |
| W.V.T.R. (unit: g-μm/m²-day) | | 171 | 232 | 229 | 183 | 187 |
| Delamination and whitening (Yes/No) | | Yes | No | No | No | No |

With reference to Table 1, Table 2, and FIG. 1, there was no delamination and whitening observed between the first thermosetting polyimide film 30 and the first thermoplastic polyimide film 20 of each polyimide metal laminated plate of Experiments 1 to 9 and there was no delamination and whitening observed between the first thermosetting polyimide film 30 and the second thermoplastic polyimide film 40 of Experiments 1 to 9. A conclusion was made that not only the water vapor between the first thermosetting polyimide film 30 and the first thermoplastic polyimide film 20 of each polyimide metal laminated plate of Experiments 1 to 9 were exhausted, but also the water vapor between the first thermosetting polyimide film 30 and the second thermoplastic polyimide film 40 of each polyimide metal laminated plate of Experiments 1 to 9 were exhausted.

TABLE 2

Properties of each polyimide metal laminated plate of Experiments 5 to 9, and thickness and raw material of the films of the same.

|  |  | Experiment 5 | Experiment 6 | Experiment 7 | Experiment 8 | Experiment 9 |
|---|---|---|---|---|---|---|
| Second thermoplastic polyimide film | Raw material | TPI-2 | TPI-2 | TPI-3 | TPI-4 | TPI-1 |
|  | Thickness (unit: μm) | 2 | 2 | 2 | 2 | 2 |
| First thermosetting polyimide film | Raw material | PI-6 | PI-6 | PI-6 | PI-6 | PI-4 |
|  | Thickness (unit: μm) | 20 | 8 | 8 | 8 | 15 |
| First thermoplastic polyimide film | Raw material | TPI-2 | TPI-2 | TPI-3 | TPI-4 | TPI-1 |
|  | Thickness (unit: μm) | 2 | 2 | 2 | 2 | 2 |
| Peeling strength (unit: kgf/cm) |  | 1.60 | 1.59 | 1.21 | 1.17 | 1.04 |
| Dimensional Stability (method B) | M.D. | 0.027% | 0.037% | −0.011% | 0.043% | 0.013% |
|  | T.D. | −0.031% | −0.005% | −0.042% | 0.002% | −0.012% |
| Dimensional Stability (method C) | M.D. | 0.018% | 0.017% | −0.021% | 0.029% | −0.006% |
|  | T.D. | −0.033% | −0.012% | −0.046% | −0.013% | −0.038% |
| Solder resistance test |  | Passed | Passed | Passed | Passed | Passed |
| W.V.T.R. (unit: g-μm/m²-day) |  | 217 | 190 | 226 | 245 | 191 |
| Delamination and whitening (Yes/No) |  | No | No | No | No | No |

On the contrary, there was delamination and whitening observed between the first thermosetting polyimide film 30 and the first thermoplastic polyimide film 20 of the polyimide metal laminated plate of Comparison 1, and there was delamination and whitening observed between the first thermosetting polyimide film 30 and the second thermoplastic polyimide film 40 of Comparison 1. A conclusion was made that both the water vapor between the first thermosetting polyimide film 30 and the first thermoplastic polyimide film 20 of the polyimide metal laminated plate of Comparison 1 and the water vapor between the first thermosetting polyimide film 30 and the second thermoplastic polyimide film 40 of Comparison 1 were not exhausted.

With reference to Table 3 and FIG. 6, there was delamination and whitening observed between the thermoplastic polyimide film 20B and the thermosetting polyimide film 30B of each polyimide metal laminated plate of Comparisons 2 to 4 whereas there was no delamination and whitening observed from each polyimide metal laminated plate of Comparisons 5 to 7. Further with reference to Tables 4 and 5, the thermosetting polyimide film 30B of each polyimide metal laminated plate of Comparisons 2 to 4 had a W.V.T.R. less than 170 g μm/m²-day whereas the thermosetting polyimide film 30B of each polyimide metal laminated plate of Comparisons 5 to 7 had a W.V.T.R. equal to or more than 170 g-μm/m²-day. Accordingly, a rationale conclusion was made that no delamination and whitening was observed from each of the polyimide metal laminated plate of Comparisons 5 to 7 because the thermosetting polyimide film 30B of each polyimide metal laminated plate of Comparisons 5 to 7 had a W.V.T.R. equal to or more than 170 g-μm/m²-day.

TABLE 3

Glass transition temperature($T_g$), coefficient of thermal expansion(C.T.E.), water vapor transmission rate(W.V.T.R.), and thickness of each thermosetting polyimide film obtained after thermally imidizing PI-1, PI-2, PI-3, PI-4, PI-5, and PI-6.

|  | Raw material of thermosetting polyimide film |  |  |  |  |  |
|---|---|---|---|---|---|---|
|  | PI-1 | PI-2 | PI-3 | PI-4 | PI-5 | PI-6 |
| $T_g$ (unit: °C.) | 335 | 323 | 316 | 349 | 356 | 342 |
| C.T.E. (unit: $10^{-6}$/°C.) | 18 | 18 | 20 | 17 | 16 | 18 |
| W.V.T.R. (unit: g/m²-day) | 2.95 | 6.41 | 7.47 | 9.44 | 13.59 | 11.20 |
| Thickness (unit: μm) | 17 | 17 | 17 | 18 | 17 | 20 |
| W.V.T.R. (unit: g-μm/m²-day) | 50 | 109 | 127 | 170 | 231 | 224 |

TABLE 4

Glass transition temperature($T_g$), coefficient of thermal expansion (C.T.E.), water vapor transmission rate(W.V.T.R.), and thickness of each of thermoplastic polyimide films obtained after thermally imidizing TPI-1, TPI-2, TPI-3, and TPI-4.

|  | Raw material of thermoplastic polyimide film |  |  |  |
|---|---|---|---|---|
|  | TPI-1 | TPI-2 | TPI-3 | TPI-4 |
| $T_g$ (unit: °C.) | 234 | 236 | 265 | 266 |
| C.T.E. (unit: $10^{-6}$/°C.) | 60 | 55 | 58 | 55 |
| W.V.T.R. (unit: g/m²-day) | 26.76 | 13.60 | 38.40 | 64.53 |
| Thickness (unit: μm) | 21 | 15 | 15 | 15 |
| W.V.T.R. (unit: g-μm/m²-day) | 562 | 204 | 576 | 968 |

TABLE 5

Delamination and whitening of each polyimide metal laminated plate of Comparisons 2 to 7, and thickness and raw material of the films of the same.

| Comparison No. | | 2 | 3 | 4 | 5 | 6 | 7 |
|---|---|---|---|---|---|---|---|
| Thermosetting polyimide film | Raw material | PI-1 | PI-2 | PI-3 | PI-4 | PI-5 | PI-6 |
| | Thickness (unit: μm) | 17~18 | 17~18 | 17~18 | 17~18 | 17~18 | 17~18 |
| Thermoplastic polyimide film | Raw material | TPI-1 | TPI-1 | TPI-1 | TPI-1 | TPI-1 | TPI-1 |
| | Thickness (unit: μm) | 2~3 | 2~3 | 2~3 | 2~3 | 2~3 | 2~3 |
| Delamination and whitening (Yes/No) | | Yes | Yes | Yes | No | No | No |

In addition, the thermosetting polyimide films 30B of Comparisons 5 to 7 were respectively made from PI-4, PI-5, and PI-6. The thermosetting polyimide films 30B of Comparisons 2 to 4 were respectively made from PI-1, PI-2, and PI-3. To fabricate PI-4, PI-5, and PI-6, the concentration of the first reactive monomer was 2.7 mol. % at least based on the total amount of the first reactive monomer and the diamine. To fabricate PI-2 and PI-3, the concentration of the first reactive monomer was less than 2.7 mol. % based on the total amount of the first reactive monomer and the diamine. There was no first reactive monomer used to fabricate PI-1.

With reference to Table 6 and FIG. 7, there was no delamination and whitening observed between the thermoplastic polyimide film 40C and the thermosetting polyimide film 30C of each polyimide metal laminated plate of Comparisons 8 to 13. Further with reference to Tables 4 and 5, the thermoplastic polyimide film 40C of each polyimide metal laminated plate of Comparisons 8 to 13 had a W.V.T.R. more than 170 g-μm/m²-day. Accordingly, a conclusion was made that no delamination and whitening was observed from the polyimide metal laminated plate of Comparisons 8 to 13 because the thermoplastic polyimide film 40C of each polyimide metal laminated plate of Comparisons 8 to 13 had a W.V.T.R. more than 170 g-μm/m²-day.

thermoplastic polyimide film 40 of each polyimide metal laminated plate of Experiments 1 to 9. In addition, by PI-4, PI-5, and PI-6 that were fabricated by using the first reactive monomer in an amount more than 3.39 mol. % based on the total amount of the first reactive monomer and the diamine, both the first thermosetting polyimide film 30 and the second thermoplastic polyimide film 40 of each polyimide metal laminated plate of Experiments 1 to 9 had a W. V. T. R. more than 170 g-μm/m²-day. By TPI-1, TPI-2, TPI-3, and TPI-4 that were fabricated by using the second reactive monomer in an amount more than 35.89 mol. % based on the total amount of the first reactive monomer and the diamine, the second thermoplastic polyimide film 40 of each polyimide metal laminated plate of Experiments 1 to 9 had a W.V.T.R. more than 170 g-μm/m²-day.

With reference to Tables 1 and 2, since each of the polyimide metal laminated plate of Experiments 1 to 9 passed the solder resistance measurement based on IPC-TM-650 2.4.13 under a condition of 300° C./30 sec, each polyimide metal laminated plate of Experiments 1 to 9 had a good solder resistance.

With reference to Tables 1 and 2, since the T.D. and M.D. measured according to the method B of IPC-TM-650 2.2.4 of each polyimide metal laminated plate of Experiments 1 to

TABLE 6

Delamination and whitening of each polyimide metal laminated plate of Comparisons 8 to 13, and thickness and raw material of the films of the same.

| Comparison No. | | 8 | 9 | 10 | 11 | 12 | 13 |
|---|---|---|---|---|---|---|---|
| Thermoplastic polyimide film | Raw material | TPI-1 | TPI-1 | TPI-1 | TPI-2 | TPI-3 | TPI-4 |
| | Thickness (unit: μm) | 2~3 | 2~3 | 2~3 | 2~3 | 2~3 | 2~3 |
| Thermosetting polyimide film | Raw material | PI-3 | PI-4 | PI-5 | PI-5 | PI-6 | PI-6 |
| | Thickness (unit: μm) | 17~18 | 17~18 | 17~18 | 17~18 | 17~18 | 17~18 |
| Delamination and whitening (Yes/No) | | No | No | No | No | No | No |

Based on the above, since both the first thermosetting polyimide film 30 and the second thermoplastic polyimide film 40 of each polyimide metal laminated plate of Experiments 1 to 9 had a W.V.T.R. more than 170 g-μm/m²-day, and the W.V.T.R. of the second thermoplastic polyimide film 40 was more than the W.V.T.R. of the first thermosetting polyimide film 30, there was no delamination and whitening observed between the first thermosetting polyimide film 30 and the first thermoplastic polyimide film 20, and between the first thermosetting polyimide film 30 and the second 9 was close to zero, and the T.D. and M.D. measured according to the method C of IPC-TM-650 2.2.4 of each polyimide metal laminated plate of Experiments 1 to 9 was close to zero, each polyimide metal laminated plate of Experiments 1 to 9 had a good dimensional stability.

With reference to Tables 1 and 2, each polyimide metal laminated plate of Experiments 1 to 9 had a peeling strength more than 0.8 kgf/cm, which demonstrates that each polyimide metal laminated plate of Experiments 1 to 9 had a good peeling strength.

To sum up, by PI-4, PI-5, and PI-6 that were fabricated by using the first reactive monomer in an amount more than 3.39 mol. % based on the total amount of the first reactive monomer and the diamine and TPI-1, TPI-2, TPI-3, and TPI-4 that were fabricated by using the second reactive monomer in an amount more than 35.89 mol. %, both the first thermosetting polyimide film 30 and the second thermoplastic polyimide film 40 of each polyimide metal laminated plate of Experiments 1 to 9 had W.V.T.R. more than 170 g-μm/m²-day. Therefore, there was no delamination and whitening observed from each polyimide metal laminated plate of Experiments 1 to 9. In addition, each polyimide metal laminated plate of Experiments 1 to 9 had good solder resistance, dimensional stability, and peeling strength.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A polyimide metal laminated plate having:
   a first metal film;
   a first thermoplastic polyimide film laminated on a surface of the first metallic film;
   a first thermosetting polyimide film laminated on a surface of the first thermoplastic polyimide film distal from the first metallic film; and
   a second thermoplastic polyimide film laminated on a surface of the first thermosetting polyimide film distal from the first thermoplastic polyimide film; wherein:
   the first thermosetting polyimide film is prepared from a thermosetting polyimide precursor polymerized by a first diamine comprising p-phenylenediamine, a first dianhydride comprising pyromellitic dianhydride and 3,3',4,4'-biphenyl tetracarboxylic dianhydride, and a first reactive monomer comprising polyoxypropylenediamine and 9,9'-bis(4-aminophenyl)fluorene;
   each of the first thermoplastic polyimide film and the second thermoplastic polyimide film is prepared from a thermoplastic polyimide precursor polymerized by a second diamine, a second dianhydride, and a second reactive monomer comprising 4,4'-(1,3-phenylenediisopropylidene)bisaniline; wherein
   based on the total amount of the thermosetting polyimide precursor, the amount of p-phenylenediamine of the first diamine is 25.05 wt %, the amount of pyromellitic dianhydride of the first dianhydride is 9.73 wt %, the amount of 3,3',4,4'-biphenyl tetracarboxylic dianhydride of the first dianhydride is 59.09 wt %, the amount of polyoxypropylenediamine of the first reactive monomer is 2.67 wt %, and the amount of 9,9'-bis(4-aminophenyl)fluorene of the first reactive monomer is 3.46 wt %.

2. The polyimide metal laminated plate as recited in claim 1, wherein the polyimide metal laminated plate has:
   a second metallic film laminated on a surface of the second thermoplastic polyimide film distal from the first thermosetting polyimide film;
   a third thermoplastic polyimide film laminated between the second metallic film and the second thermoplastic polyimide film;
   a second thermosetting polyimide film laminated between the third thermoplastic polyimide film and the second thermoplastic polyimide film; and
   a fourth thermoplastic polyimide film laminated between the second thermosetting polyimide film and the second thermoplastic polyimide film.

3. The polyimide metal laminated plate as recited in claim 1, wherein a total thickness of the first thermoplastic polyimide film, the first thermosetting polyimide film, and the second thermoplastic polyimide film ranges from 9 μm to 25 μm.

4. The polyimide metal laminated plate as recited in claim 1, wherein the second diamine comprises p-phenylenediamine, the second dianhydride comprises 3,3',4,4'-biphenyl tetracarboxylic dianhydride, and the second reactive monomer comprises 2,2'-bis(4-aminophenyl)propane; and
   based on the total amount of the thermoplastic polyimide precursor, the amount of p-phenylenediamine of the second diamine is 6.84 wt %, the amount of 3,3',4,4'-biphenyl tetracarboxylic dianhydride of the second dianhydride is 56.62 wt %, the amount of 4,4'-(1,3-phenylenediisopropylidene)bisaniline of the second reactive monomer is 29.10 wt %, and the amount of 2,2'-bis(4-aminophenyl)propane of the second reactive monomer is 7.44 wt %.

5. The polyimide metal laminated plate as recited in claim 1, wherein the second diamine comprises 1,3-bis(4-aminophenoxy)benzene, and the second dianhydride comprises 3,3',4,4'-biphenyl tetracarboxylic dianhydride and pyromellitic dianhydride; and
   based on the total amount of the thermoplastic polyimide precursor, the amount of 1,3-bis(4-aminophenoxy)benzene of the second diamine is 30.96 wt %, the amount of 3,3',4,4'-biphenyl tetracarboxylic dianhydride of the second dianhydride is 25.99 wt %, the amount of pyromellitic dianhydride of the second dianhydride is 18.69 wt %, and the amount of 4,4'-(1,3-phenylenediisopropylidene)bisaniline of the second reactive monomer is 24.35 wt %.

6. The polyimide metal laminated plate as recited in claim 1, wherein the first reactive monomer has a concentration of 6.50 mol. % based on a total molar amount of the first diamine and the first reactive monomer.

7. The polyimide metal laminated plate as recited in claim 1, wherein the second reactive monomer has a concentration ranging from 35.87 mol. % to 61.80 mol. % based on a total molar amount of the second diamine and the second reactive monomer.

8. A method of making a polyimide metal laminated plate comprising the steps of:
   polymerizing a first diamine comprising p-phenylenediamine, a first reactive monomer comprising polyoxypropylenediamine and 9,9-bis(4-aminophenyl)fluorene; and a first dianhydride comprising pyromellitic dianhydride and 3,3',4,4'-biphenyl tetracarboxylic dianhydride, in a first solvent to obtain a thermosetting polyimide precursor; wherein
   based on the total amount of the thermosetting polyimide precursor, the amount of p-phenylenediamine of the first diamine is 25.05 wt %, the amount of pyromellitic dianhydride of the first dianhydride is 9.73 wt %, the amount of 3,3',4,4'-biphenyl tetracarboxylic dianhydride of the first dianhydride is 59.09 wt %, the amount of polyoxypropylenediamine of the first reactive monomer is 2.67 wt %, and the amount of 9,9'-bis(4-aminophenyl)fluorene of the first reactive monomer is 3.46 wt %;

polymerizing a second diamine, a second reactive monomer and a second dianhydride in a second solvent to obtain a thermoplastic polyimide precursor, wherein the second reactive monomer comprises 4,4'-(1,3-phenylenediisopropylidene)bisaniline;

coating the thermoplastic polyimide precursor on a surface of a first metallic film to form a first thermoplastic polyimide precursor layer;

coating the thermosetting polyimide precursor on a surface of the first thermoplastic polyimide precursor layer distal from the first metallic film to form a first thermosetting polyimide precursor layer;

coating the thermoplastic polyimide precursor on a surface of the first thermosetting polyimide precursor layer distal from the first thermoplastic polyimide precursor layer to form a second thermoplastic polyimide precursor layer; and imidizing the first thermoplastic polyimide precursor layer, the first thermosetting polyimide precursor layer, and the second thermoplastic polyimide precursor layer to a first thermoplastic film, a first thermosetting polyimide film, and a second thermoplastic polyimide film to obtain the polyimide metal laminated plate.

9. The method as recited in claim 8, wherein the step of imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film to obtain the polyimide metal laminated plate comprises the steps of:

imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film; and laminating a second metallic film on a surface of the second thermoplastic polyimide film distal from the first thermosetting polyimide film to obtain the polyimide metal laminated plate.

10. The method as recited in claim 8, wherein the step of imidizing the first thermoplastic polyimide precursor layer, the first thermosetting polyimide precursor layer, and the second thermoplastic polyimide precursor layer to a first thermoplastic polyimide film, a first thermosetting polyimide film, and a second thermoplastic polyimide film to obtain the polyimide metal laminated plate comprises the steps of:

desolventizing the first thermoplastic polyimide precursor layer, the first thermosetting polyimide precursor layer, and the second thermoplastic polyimide precursor layer under a desolventizing temperature ranging from 80° C. to 150° C. to obtain a desolventized first thermoplastic polyimide precursor layer, a desolventized first thermosetting polyimide precursor layer, and a desolventized second thermoplastic polyimide precursor layer; and heating the desolventized first thermoplastic polyimide precursor layer, the desolventized first thermosetting polyimide precursor layer, and the desolventized second thermoplastic polyimide precursor layer simultaneously to a imidization temperature of 160° C. to 190° C., a imidization temperature of 190° C. to 300° C., and a imidization temperature of 300° C. to 350° C. in sequence to obtain the first thermoplastic polyimide film, the first thermosetting polyimide film, and the second thermoplastic polyimide film.

11. The method as recited in claim 8, wherein the first solvent is selected from a group consisted of tetrahydrofuran, N,N-dimethylformide, N,N-dimethylacetamide, N-methyl-2-pyrrolidone, γ-butyrolactone and a combination thereof.

12. The method as recited in claim 8, wherein the second diamine is selected from a group consisted of 3,4'-diaminodiphenyl ether, 4,4'-diaminodiphenyl ether, p-phenylenediamine, m-phenylenediamine, 3,5-diaminobenzoic acid, 2,2'-bis(4-aminophenyl)propane, 4,4'-diaminodiphenyl methane, 4,4'-diaminodiphenyl sulfone, 3,4'-diaminodiphenyl sulfone, 4,4'-diaminodiphenyl sulfide, 1,3-bis(4-aminophenoxy)benzene), 1,3-bis(3-aminophenoxy)benzene, 1,4-bis(4-aminophenoxy)benzene, 4,4-bis(3-aminophenoxy)biphenyl, 2,2'-bis[4-(4-aminophenoxy)phenyl]propane, 2,2'-bis[4-(3-aminophenoxy)pheny]propane, 2,2'-dimethyl-4,4'-diaminobiphenyl, 3,3'-dimethyl-4,4'-diaminobiphenyl, 3,3'-dihydroxybiphenyl-4,4'-diamino, 9,9'-bis(4-aminophenyl)fluorene), 2,2'-bis(4-(3-aminophenoxy)phenyl)sulfon, 2,6-diaminopyridine, polyoxypropylenediamine, 4,4'-(1,3-phenylenediisopropylidene)bisaniline, 4,4'-(1,4-phenylenediisopropylidene)bisaniline, norbornane dimethylamine and a combination thereof.

13. The method as recited in claim 8, wherein the second dianhydride is selected from a group consisted of pyromellitic dianhydride, 3,3',4,4'-biphenyl tetracarboxylic dianhydride, 3,3',4,4'-benzophenone tetracarboxylic dianhydride, 4,4'-oxydiphthalic dianhydride, 3,3',4,4'-diphenylsulfone tetracarboxylic dianhydride, 2,2'-bis(4-carboxyphenyl)hexafluoropropane, ethylene glycol-bis-trimellitate anhydride, 1,3-dihydro-1,3-dioxo-5-isobenzofurancarboxylic acid phenylene ester, 1,2,3,4-butanetetracarboxylic dianhydride, 1,2,3,4-cyclopentanetetracarboxylic dianhydride, and a combination thereof.

14. The method as recited in claim 8, wherein the second solvent is selected a group consisted of tetrahydrofuran, N,N-dimethylformide, N,N-dimethylacetamide, N-methyl-2-pyrrolidone, γ-butyrolactone and a combination thereof.

* * * * *